United States Patent [19]
Dondero et al.

[11] Patent Number: 5,538,432
[45] Date of Patent: Jul. 23, 1996

[54] SENSORY STIMULATION SYSTEM FOR IMPAIRED INDIVIDUALS

[76] Inventors: Susan M. Dondero, N81 W5227 Bywater La., Cedarburg, Wis. 53012; Barbara L. Redding, 201 Luisita Rd., Thiensville, Wis. 53092; Charles L. Roeder, 9827 N. Thornapple La., Mequon, Wis. 53097; David L. Sovine, 5731 N. Shore Dr., Milwaukee, Wis. 53217; Harry H. Wiese, 4380 S. 83 St., Greenfield, Wis. 53220

[21] Appl. No.: 221,827

[22] Filed: Apr. 1, 1994

[51] Int. Cl.⁶ .................................................. G09B 19/00
[52] U.S. Cl. .................................................. 434/258; 434/247
[58] Field of Search .................................. 434/258, 259, 434/260, 247, 112, 302, 301, 300, 370, 379; 446/227, 484

[56] References Cited

U.S. PATENT DOCUMENTS

| | | | |
|---|---|---|---|
| D. 187,218 | 2/1960 | McHugh | 434/258 X |
| 3,837,095 | 9/1974 | O'Hara | 434/258 |
| 3,973,334 | 8/1976 | Sterritt | 434/258 |
| 4,761,633 | 8/1988 | Leff et al. | 434/112 X |
| 4,840,374 | 6/1989 | Skinner | 434/259 X |
| 5,167,565 | 12/1992 | Metcalf | 446/491 |
| 5,254,007 | 10/1993 | Eagan | 446/227 X |

Primary Examiner—Gene Mancene
Assistant Examiner—Jeffrey A. Smith
Attorney, Agent, or Firm—Andrus, Sceales, Starke & Sawall

[57] ABSTRACT

A sensory stimulation system for stimulating a cognitively and/or physically impaired person comprises a rigid, box-like framework adapted to be mounted on a support surface and a rigid, plate-like cover in mating relationship with and removably attached to the framework. The cover is interchangeable according to the skill level of the impaired person. A plurality of spaced sensors are held fast against the cover for providing sensory stimulation for the impaired person.

12 Claims, 4 Drawing Sheets

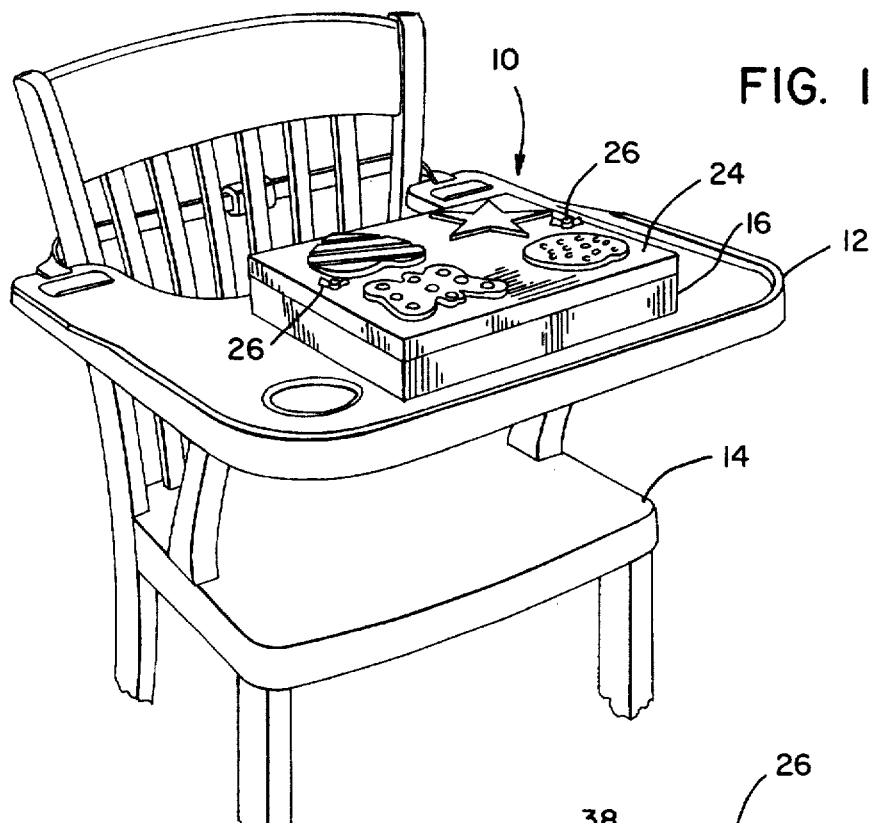
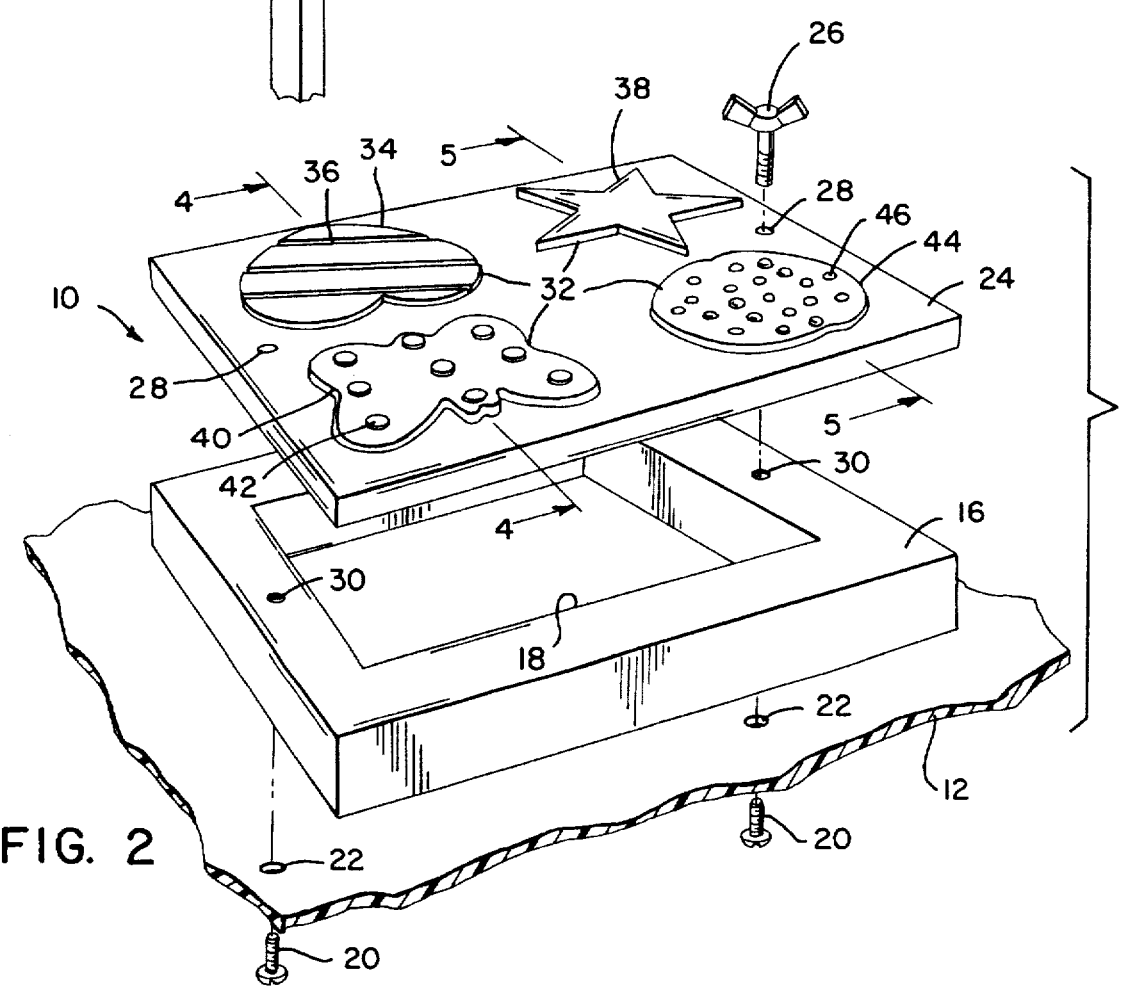

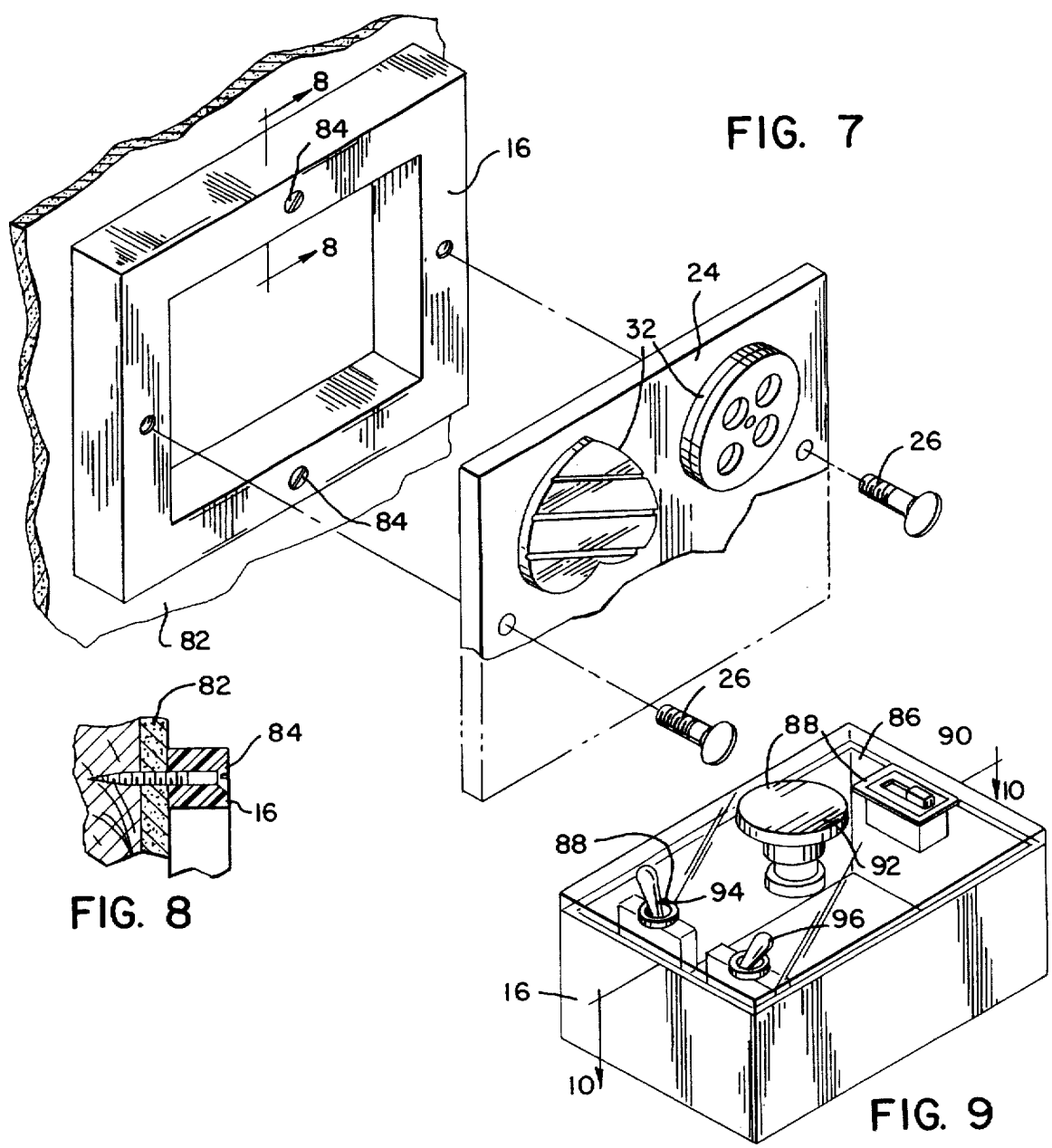
FIG. 7
FIG. 8
FIG. 9
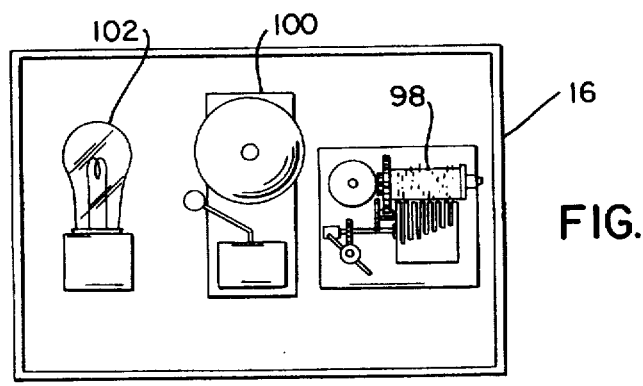
FIG. 10

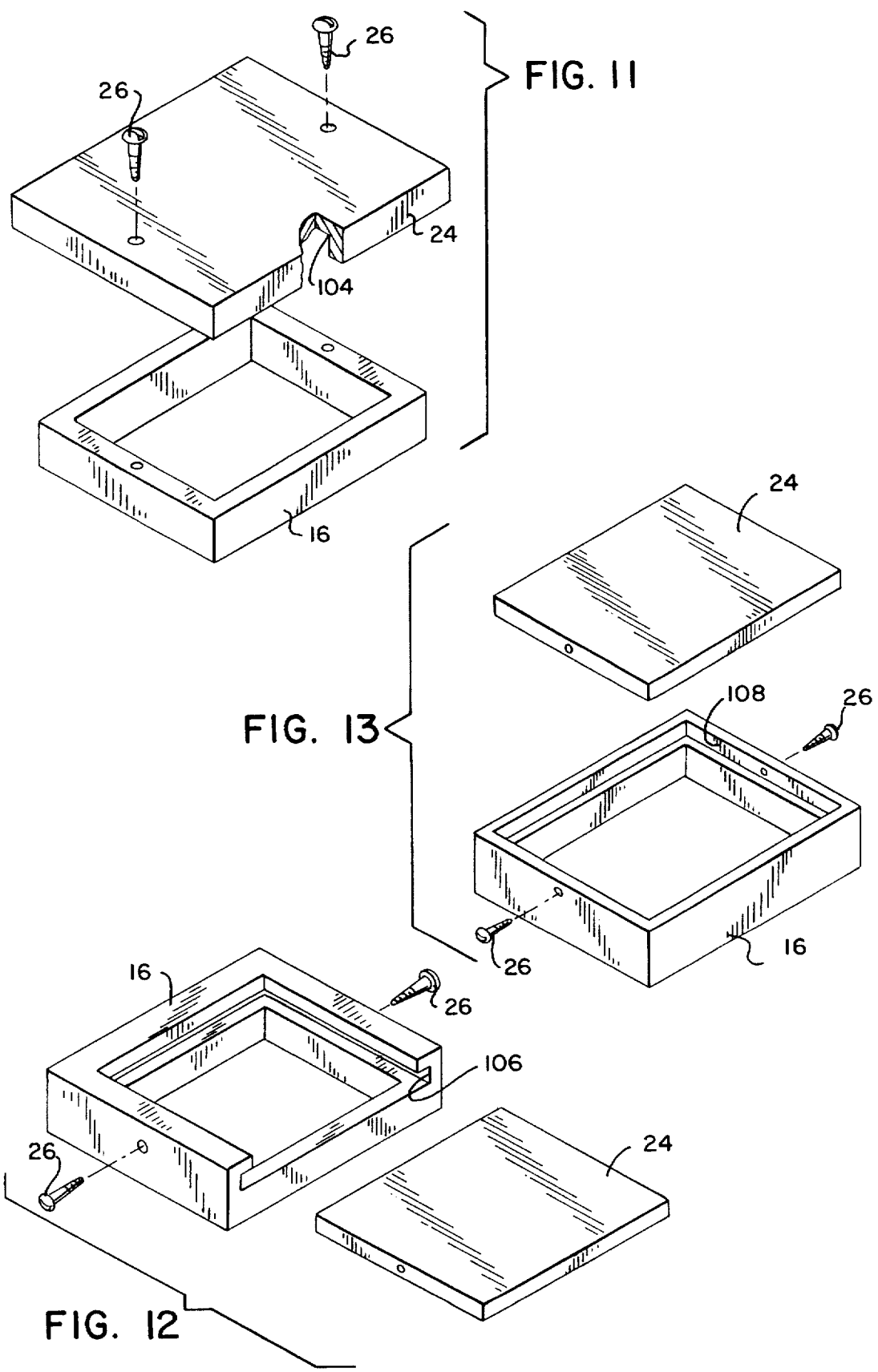

SENSORY STIMULATION SYSTEM FOR IMPAIRED INDIVIDUALS

FIELD OF THE INVENTION

This invention relates generally to sensory stimulation systems, and, more particularly, pertains to sensory stimulation systems for severely cognitively and/or physically impaired individuals requiring various levels of stimulation.

BACKGROUND OF THE INVENTION

As understanding of diseases like Alzheimers', Cerebral Palsy and others increases, so does the need to provide more meaningful treatment and care to patients with these problems. Generally, diseases like these are progressive, rendering the patient less and less able to handle even the simplest of physical tasks. Mental capabilities decrease or are limited by the disease itself and the patient is confined to a wheel or stationary chair with little to do as his or her capabilities diminish.

Currently, patients are repetitively redirected by caregivers to perform routine household tasks or home-making chores such as folding towels, sweeping floors, or setting a table. Caregivers are required to provide increasing care to the patient as the disease progresses to the point of one-on-one care. This significantly increases the cost of care and the frustration level of both the patient and caregiver.

It remains desirable to provide a system of care alternatives for patients suffering from dementia which offers increased stimulation both mentally and physically at their current level of capability. Such a system should be designed to easily increase or decrease the specific level of stimulation for each individual patient. For example, the system should contemplate stimulation ranging from low functions which deal with recognition of basic colors, shapes, and surface textures to moderate functions which includes simple dynamic movement and high functions which comprise control of lights and sounds. It is highly desirable that such systems provide a variety of mounting arrangements, all of which are safe and convenient for the patient. Properly used, this system should provide a respite for the caregiver as the patient is redirected to specific tasks designed for the discrete functional level.

SUMMARY OF THE INVENTION

The sensory stimulation system of the present invention advantageously provides a safe, stimulating alternative to repetitive redirection methods which can be used by a number of impaired patients, each having a different skill or challenge level. The sensory stimulation system has a simple construction designed for easy interchange-ability, durability and mounting versatility.

These and other aspects of the invention are realized in a sensory stimulation system for stimulating a cognitively and/or physically impaired person. The system comprises a framework, and a cover removably attached to the framework, the cover being interchangeable according to the skill level of the impaired person. At least one sensor is held fast to the cover and defines a stimulus for the impaired person.

The sensory stimulation system is adapted to be mounted on a support surface such as a lap tray, wall or wedge and contemplates a cover which is either opaque or translucent. The sensors utilized may be either static or dynamic elements and offer distinctive shapes, colors, surface textures and sounds.

In a highly preferred embodiment, the invention contemplates a sensory stimulation system for an impaired person comprising a rigid, box-like framework adapted to be mounted on a support surface and a rigid, plate-like cover in mating relationship with and removably attached to the framework. The cover is interchangeable according to the skill level of the impaired person. A plurality of sensors is held fast against the cover for providing sensory stimulation for the impaired person.

The invention further envisions a sensory stimulation system having a hollow framework interior including sight and sound devices visible through a translucent cover and responsive to sensors mounted on the cover.

BRIEF DESCRIPTION OF THE DRAWINGS

The invention will become better understood by reference to the following detailed description of the preferred exemplary embodiment when read in conjunction with the appended drawing, wherein like numerals denote like elements and:

FIG. 1 is a perspective view of the present invention as installed on a lap tray;

FIG. 2 is an exploded view of the present invention;

FIG. 7 is an exploded view of the present invention with another alternative mounting;

FIG. 8 is a detailed, cross-sectional view taken on line 8—8 of FIG. 7;

FIG. 9 is a perspective view of another alternative version of the present invention;

FIG. 10 is a planar view taken on line 10—10 of FIG. 9; and

FIGS. 11-13 are exploded views of further alternative versions of the present invention.

DETAILED DESCRIPTION OF THE PREFERRED EMBODIMENT

Figure 3:
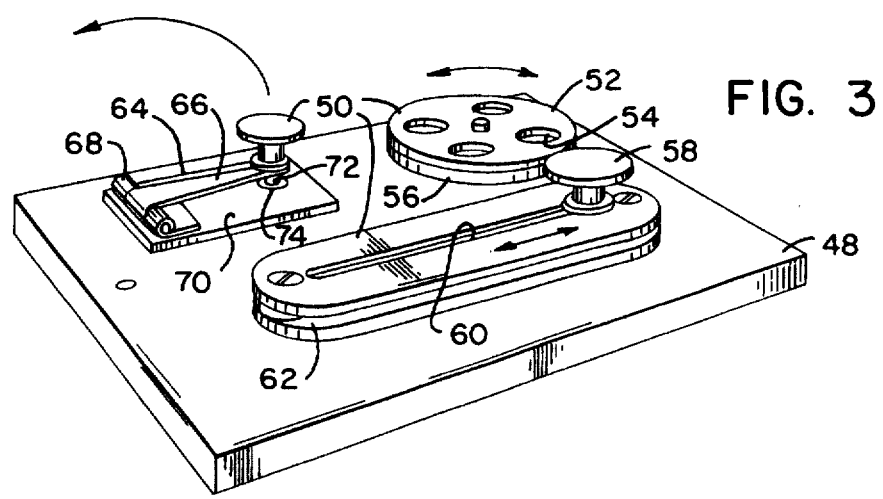
FIG. 3 is a perspective view of an alternative version of the present invention.
Figure 4:
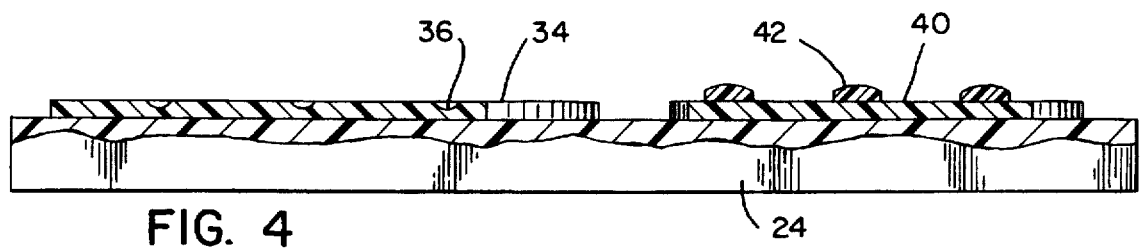
FIG. 4 is a cross-sectional view taken on line 4—4 of FIG. 2.
Figure 5:
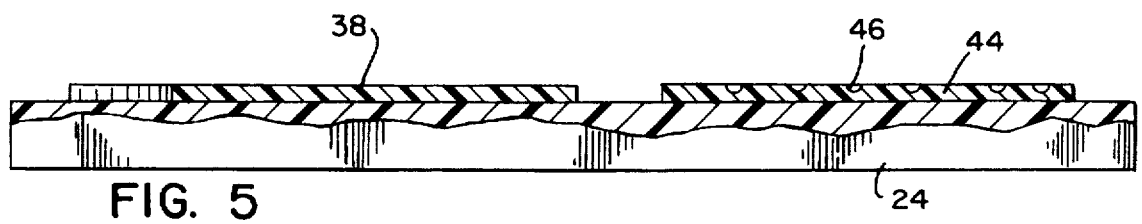
FIG. 5 is a cross-sectional view taken on line 5—5 of FIG. 2.

Referring now to FIG. 1, a sensory stimulation system 10 embodying the present invention is shown mounted to a lap tray 12 which is in turn secured to the arms and back of a chair 14. Although a standard armed chair 14 is shown in the preferred embodiment, it should be understood that the lap tray mounting of the present invention may also apply to other suitable chairs, such as wheelchairs. The invention also contemplates a variety of alternative mountings to be described hereafter.

As seen in FIG. 2, the sensory stimulation system 10 for the present invention comprises a rigid, box-like framework 16 of generally rectangular configuration having a hollow interior 18 for a purpose to be later described. Frame-work 16 is adapted to be mounted to lap tray 12 by fasteners 20 which pass through holes 22 formed in lap tray 12 and are screw threaded into complimentary holes (not shown) formed in the bottom of framework 16. A rigid, plate-like cover 24 of generally rectangular configuration is in mating relationship with and is removably attached to framework 16 by a pair of fasteners 26 which pass through holes 28 formed in the cover 24 and are screw threaded into respective sockets 30 imbedded in the top of framework 16. A plurality of rigid, spaced apart sensors 32 are held fast against cover 24 such as by adhesive for providing sensory stimulation for the impaired person using the system. In the preferred embodiment of FIG. 2, sensors 32 are designed for an individual with severely limited cognitive and/or physical capabilities and comprise a heart 34 formed with a series of spaced ridges 36 thereon, a star 38, a butterfly 40 provided with a series of buttons 42 thereon and a fruit 44 formed with a series of depressions 46 therein.

As a salient feature of the invention, cover 24 is interchangeable according to the skill or challenge level of the impaired person using the system. FIG. 3 shows an alternative cover 48 which may be used in lieu of cover 24 and attached to framework 16. Cover 48 is designed for individuals with less severe disabilities and is provided with a series of dynamic sensors 50 having parts which move relative to cover 48. Such sensors 50 take the form of, for example, a rotatable disk 52 having apertures 54 which are aligned with a multi-colored similar disk 56 underneath, a knob 58 slidably mounted in an elongated slot 60 formed in a two layer plate assembly 62, and a "woodpecker" device 64 comprising a knob-arm assembly 66 pivotally mounted about a hinge 68 to a complimentary base 70. The underside of knob-arm assembly 66 and the top surface of base 70 are provided with projections 72, 74 which will produce a "pecking" noise when knob-arm assembly 66 contacts base 70.

Figure 6:
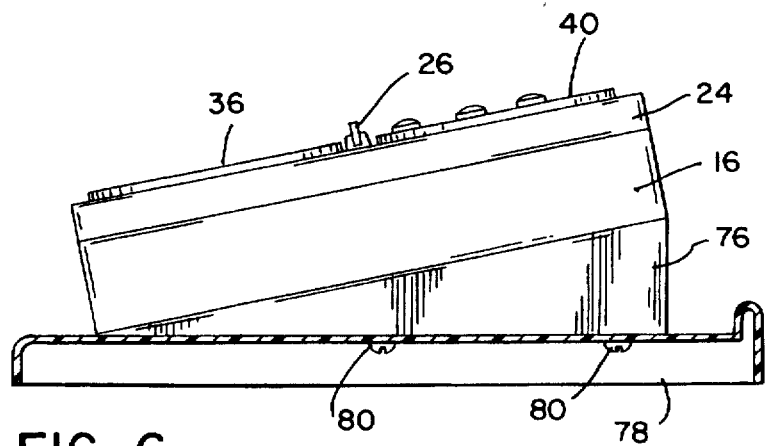
FIG. 6 is an end view of the present invention shown in FIG. 2 with an alternative mounting.

The invention further contemplates different mounting arrangements to offer a degree of versatility. For example, FIG. 6 shows the sensory stimulation system being mounted on a wedge-shaped or inclined surface 76 which in turn is fastened on the underside to a support surface 78 by screws 80 such that the system can be tilted or inclined toward a patient. FIGS. 7 and 8 show a wall-mounted version of the sensory stimulation system in which frame-work 16 is secured to wall 82 by wood screws 84 along the top and bottom of frame 16 and in which interchangeable cover 24 is again removably fastened to the sides of framework 16 by fasteners 26.

FIGS. 9 and 10 show an alternative embodiment of the present invention wherein framework 16 is coupled with a translucent or frosted cover 86 having a plurality of spaced sensors 88 taking the form of a slide switch 90, a mushroom knob switch 92, and a pair of toggle switches 94, 96. Each of sensors 88 are respectively connected to a musical device such as used in a music box 98, an electric doorbell 100, and a light bulb 102. Suitable wiring and batteries for operating the doorbell and the light are included in the interior of framework 16 but are not shown for simplification.

FIG. 11 shows a box cover concept of the present invention in which interchangeable cover 24 has a recess 104 into which underlying framework 16 fits. FIG. 12 illustrates a slide-in plate concept wherein framework 16 is provided with a slot 106 within which interchangeable cover 24 slides. FIG. 13 depicts a drop-in plate concept wherein framework 16 is formed with a recess 108 in its upper portion within which interchangeable cover 24 is dropped and retained. In each of FIGS. 11–13, fasteners 26 are used to removably mount cover 24 to framework 16 and at least one sensor 32 is attached to cover 24 as previously described.

It should be appreciated that various interchangeable covers having a combination of dynamic and static sensors may be designed according to the skill level of the patient. Each of the sensors is formed with a distinctive shape, color, texture, and/or sound. In addition to the sensors disclosed herein, the invention further contemplates high functional components such as a window sash lock, a door chain and a sliding door bolt which would be operated only by less impaired patients.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. A sensory stimulation system for stimulating a cognitively or physically impaired person, the system comprising:

a framework;

a cover removably attached to said framework, said cover being interchangeable according to the skill level of the impaired person; and at least one sensor held fast to said cover and defining a stimulus for the impaired person, wherein said cover is removably attached to said framework by fasteners passed through said cover and screw threaded into said framework.

2. The sensory stimulation system of claim 1, including a support surface on which said framework is disposed.

3. The sensory stimulation system of claim 2, wherein said support surface is a lap tray.

4. The sensory stimulation system of claim 2, wherein said support surface is a wall.

5. The sensory stimulation system of claim 2, wherein said support surface is inclined.

6. The sensory stimulation system of claim 1, wherein said framework has a generally rectangular configuration and a hollow interior.

7. The sensory stimulation system of claim 6 wherein said hollow interior of said framework includes at least one of sight and sound devices responsive to said at least one sensor.

8. The sensory stimulation system of claim 1, wherein said sensor is a static element.

9. The sensory stimulation system of claim 1, wherein said sensor is a dynamic element.

10. The sensory stimulation system of claim 1, wherein said cover is opaque.

11. The sensory stimulation system of claim 1, wherein said cover is translucent.

12. The sensory stimulation system of claim 11, wherein said cover includes at least one switch.

\* \* \* \* \*